United States Patent Office 3,847,950
Patented Nov. 12, 1974

3,847,950
α,α-DIALKYLPHENETHYLAMINE DERIVATIVES
John T. Suh, Mequon, and Thomas M. Bare, Milwaukee, Wis., assignors to Colgate-Palmolive Company, New York, N.Y.
No Drawing. Filed Sept. 28, 1972, Ser. No. 293,126
Int. Cl. C07d 13/10
U.S. Cl. 260—340.5    3 Claims

ABSTRACT OF THE DISCLOSURE

The α,α-dialkylphenethylamine derivatives are useful as anti-Parkinson agents. The compound α,α-dimethyl-3,4-methylenedioxyphenethylamine hydrochloride is especially useful since it is a selective dopamimetic which does not have the stimulant noradrenergic properties of amphetamine.

BACKGROUND OF THE INVENTION

The preparation of structurally related compounds is described in Belgian Pat. No. 751,190; French Pat. No. 2,051,566; and an article by F. H. Marquardt and S. Edwards in *J. Org. Chem.*, 37, 1861.

DETAILED DESCRIPTION OF THE INVENTION

The compounds of the present invention have the following formula:

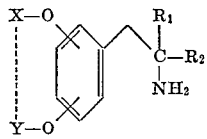

in which X and Y are hydrogen, lower alkyl of 1 to 4 carbon atoms such as methyl, ethyl, isopropyl or butyl, phenyl-lower alkyl of 7 to 13 carbon atoms such as benzyl or phenethyl, or X----Y is —CH$_2$—, and R$_1$ and R$_2$ are a lower alkyl such as methyl, ethyl, isopropyl or butyl.

The compound 3,4-dihydroxy - α,α-dimethylphenethylamine hydrochloride is representative of the novel compounds and it is preferably prepared by treating diisopropylamine in anhydrous tetrahydrofuran with butyllithium in hexane at a temperature below 10° C. The lithium diisopropylamide thus obtained is treated with isobutyric acid at reduced temperatures and 3,4-dibenzyloxybenzyl chloride added to form 3-(3,4 - dibenzyloxyphenyl) - 2,2 - dimethylpropionic acid. The thus obtained acid is refluxed with thionyl chloride in benzene for about 2.5 hours and the reaction product consolidated, dissolved in acetone and sodium azide added to the acetone solution. The resulting mixture is diluted with water and extracted with benzene. The benzene extracts are dried, filtered and heated to reflux under nitrogen. The resulting mixture is acidified with hydrochloric acid and once again heated to reflux. It is then diluted with water and ether, the ether layer collected, concentrated and dissolved in benzene. Concentration of the benzene solution gives 3,4-dibenzyloxy - α,α-dimethylphenethylamine hydrochloride which is hydrogenated in the presence of 10% palladium-on-carbon in the presence of hydrochloric acid to give 3,4 - dihydroxy-α,α-dimethylphenethylamine hydrochloride.

The described method of preparation may be illustrated as follows:

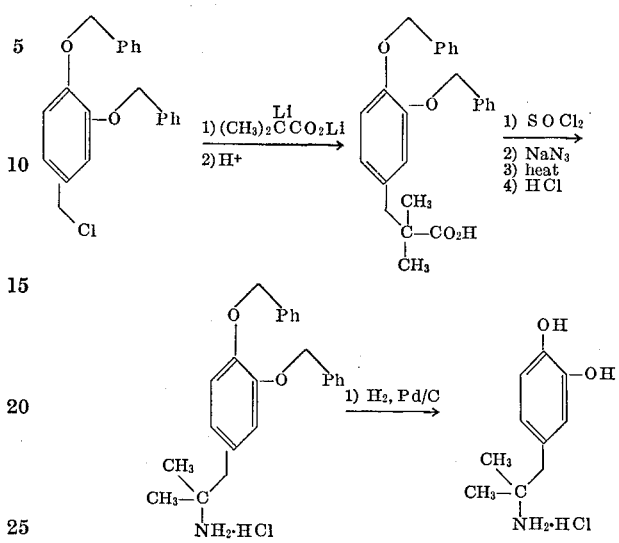

Other compounds of the invention which may be prepared in an analogous manner are:

3,4-dihydroxy-α,α-diethylphenethylamine,
3,4-dihydroxy-α,α-dibutylphenethylamine,
3,4-dibenzyloxy,α,α-diethylphenethylamine, and
3,4-dibenzyloxy-α,α,dibutylphenethylamine.

The methylenedioxy derivatives, that is, those in which X----Y is —CH$_2$—, may be prepared in essentially the same way as the described process except, of course, that the final hydrogenation step of the described process is not necessary. Among the methylenedioxy derivatives that may be prepared are the following:

α,α-dimethyl-3,4-methylenedioxyphenethylamine,
α,α-diethyl-3,4-methylenedioxyphenethylamine,
α,α-dipropyl-3,4-methylenedioxyphenethylamine, and
α,α-dibutyl-3,4-methylenedioxyphenethylamine.

The compound α,α-dimethyl - 3,4 - methylenedioxyphenethylamine hydrochloride was effective at intraperitoneal doses of 30 and 60 mg./kg. of body weight in reversing oxotremorine gait depression and in increasing the mobility of mice pretreated with low doses of oxotremorine.

Pharmaceutical compositions will generally contain the novel compounds in combination with conventional pharmaceutical diluents. Such compositions may take the form of tablets, capsules, solutions or suspensions for oral administration or solutions for inhalation or parenteral administration. The active ingredients may be employed in the form of their free bases. However, they will generally be employed in the form of acid addition salts such as hydrochlorides, sulfates, fumarates and the like.

The individual dosage forms may contain from about 10 mg. or less of the active ingredient calculated as the free base to more than 100 mg. The patient may be given one or more of such compositions. However, the daily dose normally will not exceed 50 mg./kg. of body weight.

The invention is further illustrated by the examples which follow.

EXAMPLE 1

2,2-Dimethyl-3-(3,4-methylenedioxyphenyl)propionic acid

To a stirred, cooled (ice-salt bath) solution of 20.24 g. (200 mmoles) of diisopropylamine in 125 ml. of anhydrous tetrahydrofuran (THF) is added dropwise 200 mmoles (127 ml. of 1.57 M) butyllithium in hexane. To the resulting solution is added dropwise 8.81 g. (100 mmoles) of isobutyric acid while maintaining the reaction mixture temperature below 10°. After the addition is complete, the mixture is warmed to 30° for one minute so that the small quantity of gelatinous precipitate which forms dissolves. The resulting clear pale yellow solution is cooled to −2° and 17.06 g. (100 mmoles) of 3,4-methylenedioxybenzyl chloride is added quickly in one portion. The temperature rises to 30° during the exothermic reaction and the resulting solution is stirred at 30–35° for four hours. After diluting the reaction mixture with water, 10 ml. of 20% sodium hydroxide, and 100 ml. of n-hexane, the aqueous layer is separated, washed with either, acidified with concentrated HCl, and extracted with ether. The combined ether extracts are dried over $MgSO_4$, filtered, and concentrated to leave 20.20 g. of a pale orange liquid. Distillation of this material gives 16.35 g. (73.7%) of a golden liquid which slowly crystallizes. Recrystallization from n-heptane gives 2,2-dimethyl-3-(3,4-methylenedioxyphenyl)propionic acid as pale tan plates, m.p. 61–62°.

Anal.—Calcd. for $C_{12}H_{14}O_4$: C, 64.85; H, 6.35. Found: C, 65.05; H, 6.25.

EXAMPLE 2

α,α-Dimethyl-3,4-methylenedioxyphenethylamine hydrochloride

A stirred solution of 9.28 g. (44.2 mmoles) of 2,2-dimethyl-3-(3,4-methylenedioxyphenyl)propionic acid, 5.27 g. (44.2 mmoles) of thionyl chloride, and 13 ml. of benzene is heated slowly to reflux and refluxed for 2.5 hours. The resulting solution is concentrated on a rotary to leave the acid chloride as a yellow liquid which is added dropwise and with stirring to a solution of 5.57 g. (88.4 mmoles) of sodium azide in 51 ml. of water and 51 ml. of acetone at 0°. The mixture is stirred for 15 minutes at 0°, diluted with 20 ml. of water, and extracted with cold benzene. The combined cold benzene extracts are dried over $MgSO_4$, filtered, and refluxed for 1.5 hours until the nitrogen evolution appears to be complete. The benzene solution of the isocyanate is allowed to just stop refluxing and 8 ml. of concentrated HCl is added in one portion with vigorous stirring. An immediate vigorous gas evolution occurs and the mixture is stirred at reflux for five minutes, after which the carbon dioxide evolution appears to be complete. The mixture is diluted with 30 ml. of water, cooled, and extracted with dilute hydrochloric acid. The combined acid extracts are made basic with 20% sodium hydroxide and extracted with ether. The combined ether extracts are dried over $MgSO_4$, filtered, and concentrated to leave 9.04 g. of a pale yellow liquid which, upon distillation (Kugelrohr, pot temperature 125–135° at 5 mm.), gives the desired amine as a clear colorless liquid. A portion of α,α-dimethyl-3,4-methylenedioxyphenethylamine is dissolved in anhydrous ether and acidified with ethereal hydrochloric acid. The resulting white solid is collected, dried, and recrystallized from isopropanol-ether to give the amine hydrochloride as white crystals, m.p. 168.5–169.5°.

Anal.—Calcd. for $C_{11}H_{16}ClNO_2$: C, 57.51; H, 7.02; N, 6.10; Cl, 15.44. Found: C, 57.59; H, 6.87; N, 6.02; Cl, 15.31.

EXAMPLE 3

3-(3,4-Dibenzyloxylphenyl)-2,2-dimethylpropionic acid

To a stirred cold (ice-salt bath) solution of 9.85 g. (97.4 mmoles) of diisopropylamine in 65 ml. of anhydrous tetrahydrofuran is added dropwise 97.4 mmoles of 1.6 M butyllithium in hexane while the temperature is maintained below 10°. To the resulting stirred solution of lithium diisopropylamide is added dropwise 4.28 g. (48.7 mmoles) of isobutyric acid while maintaining the temperature below 10°. After the addition is complete, the solution is warmed to 25° for one minute and then cooled to −4°. 3,4-Dibenzyloxybenzyl chloride (16.50 g., 48.7 mmoles) is added in one portion and an exothermic reaction occurs with the temperature rising to 30°. The reaction mixture is stirred at 30–35° for two hours and then diluted with 50 ml. of n-heptane, 75 ml. of water, and 5 ml. of 20% aqueous sodium hydroxde. Three layers form. The bottom aqueous layer is separated and discarded while the middle dark layer is separated, suspended in water, and acidified with 20% hydrochloric acid. The resulting mixture is extracted with ether and the combined ether extracts are washed with water, dried over $MgSO_4$, filtered, and concentrated to leave a tan solid. Recrystallization from ethyl acetate-n-heptane gives 3-(3,4-dibenzyloxyphenyl)-2,2-dimethylpropionic acid as tan needles, m.p. 108–109°.

EXAMPLE 4

3,4-Dibenzyloxy-α,α-dimethylphenethylamine hydrochloride

A mixture of 4.02 g. (10.3 mmoles) of carboxylic acid of Example 3 and 1.23 g. (10.3 mmoles) of thionyl chloride in 5 ml. of benzene is heated slowly to reflux and refluxed for 2.5 hours. The solution is cooled and concentrated to leave a dark viscous oil. An acetone solution of this material is added dropwise to a vigorously stirred solution of 1.34 g. (20.6 mmoles) of sodium azide in 14 ml. of acetone and 11 ml. of water cooled to 0°. The resulting mixture is stirred for 15 minutes at 0°, diluted with cold water and extracted with cold benzene. The combined cold benzene extracts are dried over $MgSO_4$, filtered, and heated to reflux under nitrogen for three hours. The heat source is removed and 1.9 ml. of concentrated hydrochloric acid added to the hot stirred solution, whereupon a vigorous gas evolution occurs. The mixture is refluxed for five minutes, cooled and diluted with water and 50 ml. of ether. The aqueous layer is separated and the organic layer filtered and concentrated to leave a brown residue. This is dissolved in benzene and concentrated to leave a white solid which is recrystallized from benzene-n-heptane to give 3,4-dibenzyloxy-α-α-dimethylphenethylamine hydrochloride as a tan solid, m.p. 113–115°.

EXAMPLE 5

3,4-Dihydroxy-α,α-dimethylphenethylamine hydrochloride

To a suspension of 0.33 g. of 10% palladium-on-carbon (prereduced) in 42 ml. of ethanol is added a solution of 3.32 g. (8.34 mmoles) of the dibenzyloxyamine hydrochloride of Example 4 in 50 ml. of ethanol containing 2 drops of concentrated hydrochloric acid. The resulting mixture is hydrogenated at atmospheric pressure. After 5.75 hours, the hydrogen uptake stops (412 ml. $H_2$ consumed, 102% of theory) and the mixture is filtered; the filtrate is concentrated to leave a clear gum which slowly crystallizes. Two recrystallizations from isopropanol-ether give 3,4-dihydroxy-α,α-dimethylphenethylamine hydrochloride as a tan solid, m.p. 223.5–224.5°.

Anal.—Calcd. for $C_{10}H_{16}ClNO_2$: C, 55.17; H, 7.41; N, 6.44. Found: C, 55.30; H, 7.40; N, 6.19.

We claim:
1. A compound selected from the class consisting of a compound of the formula

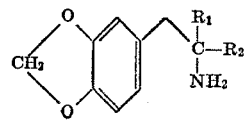

in which $R_1$ and $R_2$ are lower alkyl, and pharmaceutically acceptable salts thereof.

2. The compound of claim 1 which is α,α-dimethyl-3,4-methylenedioxyphenethylamine.

3. The compound of claim 1 which is α,α-dimethyl-3,4-methylenedioxyphenethylamine hydrochloride.

References Cited
UNITED STATES PATENTS 3,211,792  10/1965  Osbond et al. _____ 260—340.5
3,700,692  10/1972  Suh et al. _____ 260—340.5

DONALD G. DAUS, Primary Examiner

J. H. TURNIPSEED, Assistant Examiner

U.S. Cl. X.R.

260—570.8 R; 424—282